Patented July 14, 1931

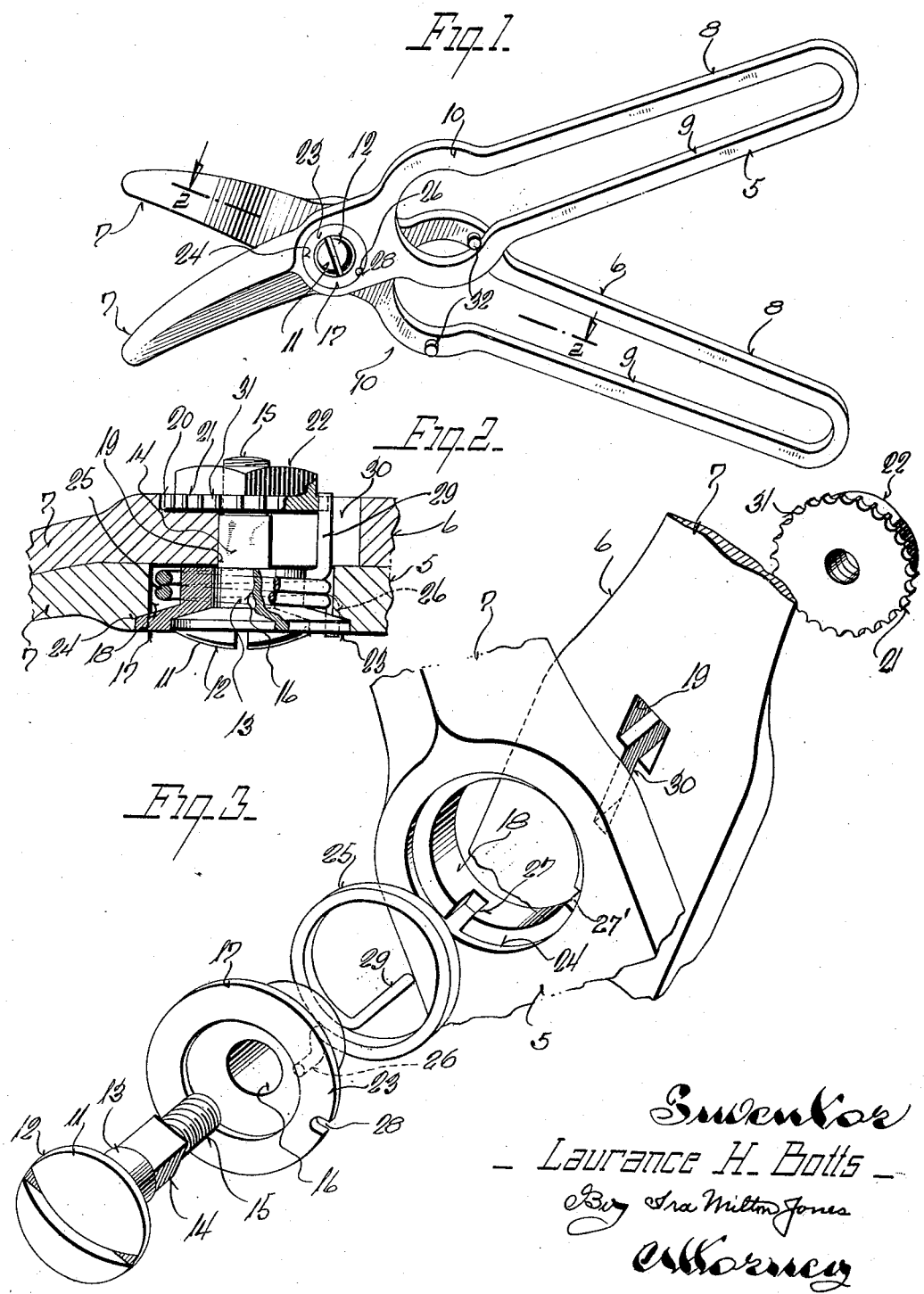

1,814,821

UNITED STATES PATENT OFFICE

LAURANCE H. BOTTS, OF DE LAND, FLORIDA

SHEARS

Application filed July 28, 1930. Serial No. 471,185.

This invention relates to certain new and useful improvements in shears and has as an object the provision of improved means for pivotally connecting the complementary members of a pair of shears or other similar tool.

Heretofore the means for pivotally connecting the members of a pair of shears or other similar tool very often became worn and necessitated discarding the tool long before the end of its useful life. It is, therefore, a more specific object of this invention to provide an improved means for pivotally connecting the members of a pair of shears wherein those elements subject to wear are readily replaceable.

Another object of this invention resides in the provision of spring means incorporated within the pivotal connection of the shear members for simultaneously yieldably maintaining the shears open and providing means for locking the nut member of the pivotal connection against accidental rotation.

It is also an object of this invention to provide a construction for shears and similar tools wherein the complementary members are readily reversible to enable both sides of the blades to be used, thus greatly increasing the useful life of the tool.

With the above and other objects in view which will appear as the description proceeds, my invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawings, I have illustrated one complete example of the physical embodiment of my invention constructed according to the best mode I have so far devised for the practical application of the principles thereof, and in which:

Figure 1 is a perspective view of a pair of shears embodying my invention and particularly adapted for use as fruit clippers;

Figure 2 is an enlarged, cross sectional view taken through Figure 1 on the plane of the line 2—2; and Figure 3 is a perspective detail view of the various elements comprising the pivotal connection of the shears shown separated and disposed in their proper order of assembly.

Referring now more particularly to the accompanying drawings in which like numerals designate like parts throughout the several views, the numerals 5 and 6 represent two complementary members of a pair of shears, each having a cutting blade 7 and a handle portion 8. In the present instance the cutting blades 7 are slightly curved laterally and are sharpened either at both sides or only at their meeting edges. The handle portions 8 of the shear members are preferably cut out, as at 9, to reduce the weight of the structure and have enlarged cylindrical portions 10.

The members 5 and 6 are pivotally connected by means of a structure best illustrated in figures 2 and 3, comprising a screw 11 having an enlarged circular head 12 and a shank divided into a cylindrical stem 13 adjacent the head, a squared portion 14 outwardly of the cylindrical stem, and an externally threaded outer end 15. The screw extends through and is freely rotatable in a counterbored aperture 16 formed in a bearing member 17 which is received in an opening 18 formed in the member 5.

The thickness of the bearing 17 is substantially equal to that of the member 5 and the juncture of the cylindrical stem 13 and squared portion 14 of the screw is substantially in alignment with the inner end of the bearing 17 so that the squared screw portion extends into a correspondingly shaped opening 19 formed in the member 6.

It is noted that the squared portion of the screw is of less length than the thickness of the member 6, and terminates adjacent the bottom of a counterbore 20 formed in the outer face of the member 6, in which the flange 21 of a nut 22 is received, the nut 22 being threaded on the outer threaded end 15 of the screw to secure the elements assembled.

The opening 18 in which the bearing member 17 is positioned, is substantially larger than the major portion of the bearing to provide an annular channel closed at its sides by the inner face of the member 6 and a flange 23 formed on the bearing and received in a counterbore 24 communicating with the bore 18. Received in the annular channel are the coils of a spring 25 which serves the dual function of yieldably maintaining the members 5 and 6 open and locking the nut 22 against accidental rotation.

For this purpose one end 26 of the spring is directed radially and laterally to extend beyond the outer periphery of the spring and be received in one of two recesses 27 and 27' formed in the member 5 in communication with its bore 18, the outermost portion of the spring end 26 being received in a notch 28 formed in the periphery of the bearing flange 23 so that the spring end 26 not only secures itself against relative rotation with respect to the member 5, but also locks the bearing member against rotation with respect to said member 5.

The opposite end 29 of the spring is extended outwardly from the annular chamber in which its coils are disposed, through a slot 30 formed in the member 6 in communication with its square opening 19, to engage its outermost portion with the serrated peripheral edge 31 of the nut member flange 21. The end 29 of the spring is thus securely connected with the member 6 and is yieldably maintained in engagement with the serrated edge of the nut member flange to prevent accidental rotation of the nut member; and inasmuch as the screw is held against rotation with respect to the member 6 by its square shank portion being received in the correspondingly square opening, it is apparent that relative rotation between the nut and the screw is restrained.

The location of the recesses 27 and 27' and the relative positions of the spring ends 26 and 29 is such that when the spring is released it maintains the members 5 and 6 open, as illustrated in Figure 1, and to prevent excessive opening movement, stub pins 32 are carried by the circular portion 10 of the member 6, one of which engages the inner periphery of the circular portion formed in the member 5, as will be readily apparent. The other stub pin functions in the same manner when the complementary members are reversed.

The provision of the two recesses 27 and 27' enables the shear members to be reversed, thus permitting both edges of its blades to be used, for when the spring end 26 is engaged in the recess 27 the closing action of the shears tends to wind up the spring and when it is engaged in the other recess 27' the closing action of the shears tends to unwind the spring. In each instance, however, the shears are yieldably maintained open. Obviously, both edges of the blades 7 of both shear members may be sharpened at the time of manufacture, or the second set of edges may be left unground until the first set becomes worn.

From the foregoing description, taken in connection with the accompanying drawing it will be readily apparent to those skilled in the art to which an invention of the character described appertains, that I provide a construction for shears and similar tools wherein all wear on the pivotal connection is between two readily replaceable members, and wherein a single simple spring provides means for yieldably maintaining the complementary members open and for locking the nut member of the pivotal connection against accidental rotation.

What I claim as my invention is:

1. In a tool of the character described having complementary members pivotally connected for relative movement about their pivotal connection, a single yieldable means for normally maintaining the members in predetermined relative positions of movement about said pivotal connection and for preventing accidental separation of said members.

2. In a tool of the character described including pivotally connected members, means for pivotally connecting the said members including a nut member, a single yieldable means for normally maintaining said members in predetermined relative positions of movement about said pivotal connection and for restraining rotation of the nut member to prevent accidental separation of said members.

3. In a tool of the character described including a pair of pivotally connected members having aligned openings, means for pivotally connecting said members comprising a bearing received in the opening of one member, a screw freely rotatable in the bearing and non-rotatably received in the opening in the other member, a nut threaded on said screw, and a single yieldable means for normally yieldably holding the members in predetermined relative positions of movement about the pivotal connection and for preventing accidental detachment of the nut member from said screw.

4. In a tool of the character described including two pivotally connected members having aligned openings, means for pivotally connecting said members comprising a bearing readily removably mounted in the opening in one of said members, a screw having a part freely rotatably received in said bearing and a part non-rotatably received in the opening in said other member, a nut threaded on the screw, and single means for holding the bearing against rotation with respect to the member in which it is mounted and for holding the nut member against rotation with respect to the other member and the screw.

5. In a tool of the character described including complementary pivotally connected members having aligned openings, means for pivotally connecting said members comprising a bearing mounted in the opening in one of said members, said bearing cooperating with said opening to form an annular channel, a screw freely rotatable in said bearing and non-rotatably received in the opening of the other member, a nut on the screw, and a spiral spring having its convolutions disposed in said annular channel and simultaneously normally maintaining the complementary members in predetermined relative positions and holding the bearing member against rotation in its opening and the nut member against rotation with respect to the screw.

6. In a tool of the character described, including a pair of pivotally connected members, means for pivotally connecting said members comprising, a bearing carried by one member, and a screw freely rotatable in the bearing and received in said other member, and yieldable means for normally yieldably holding the members in predetermined relative positions and for preventing rotation of the bearing in said first mentioned member.

In testimony whereof I have hereunto affixed my signature.

LAURANCE H. BOTTS.